A. J. AITKEN.
POWER ATTACHMENT FOR AUTOMOBILES.
APPLICATION FILED JULY 30, 1917.
1,332,589.
Patented Mar. 2, 1920.
2 SHEETS—SHEET 2.
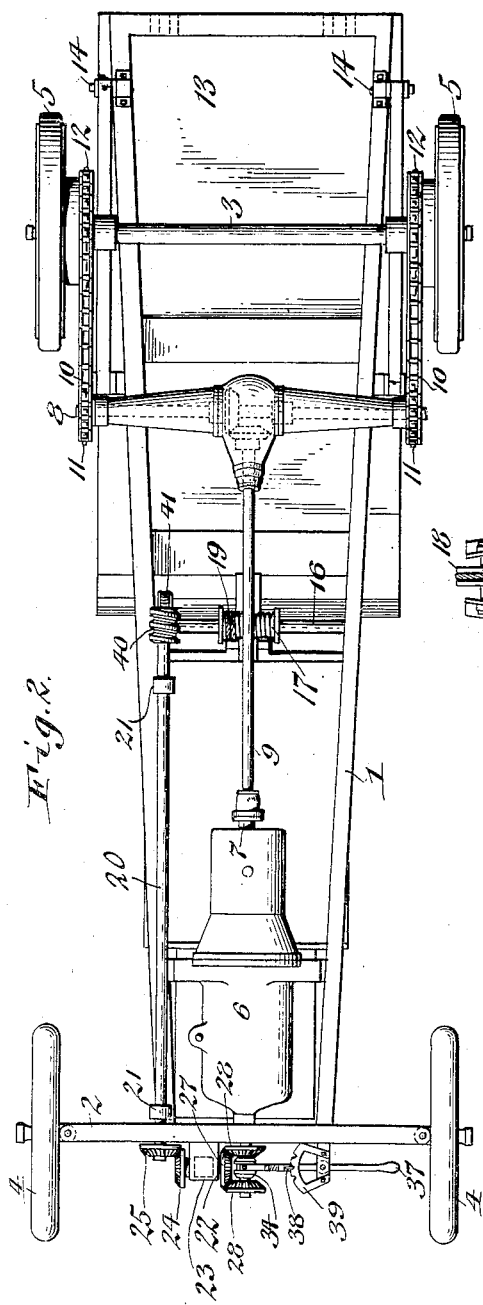
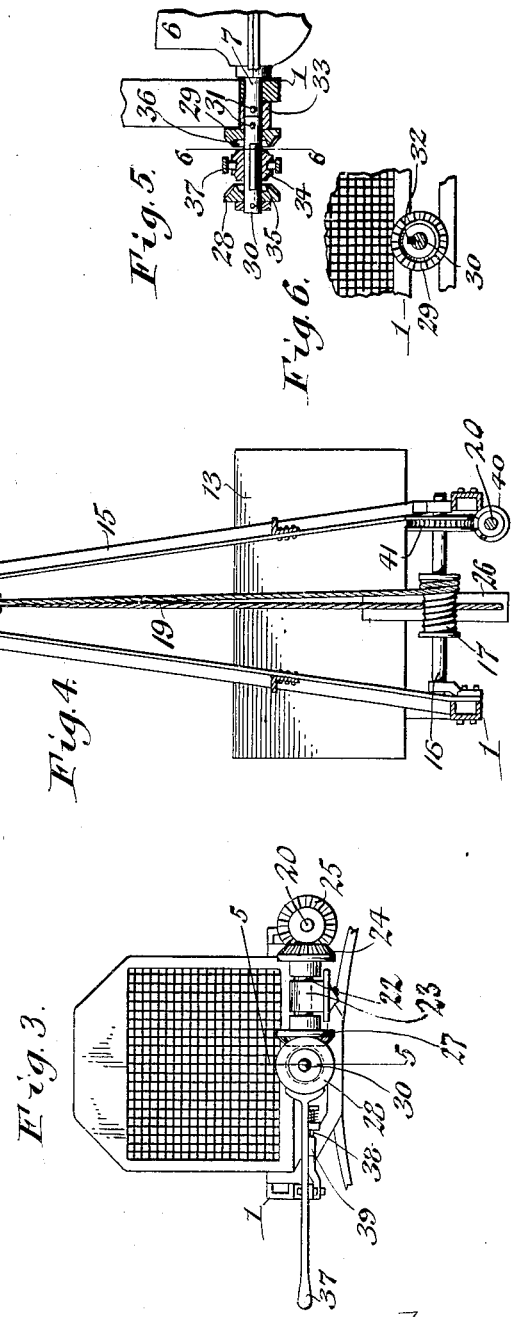
Inventor
A. J. Aitken
by Leyer & Topp
Attorneys

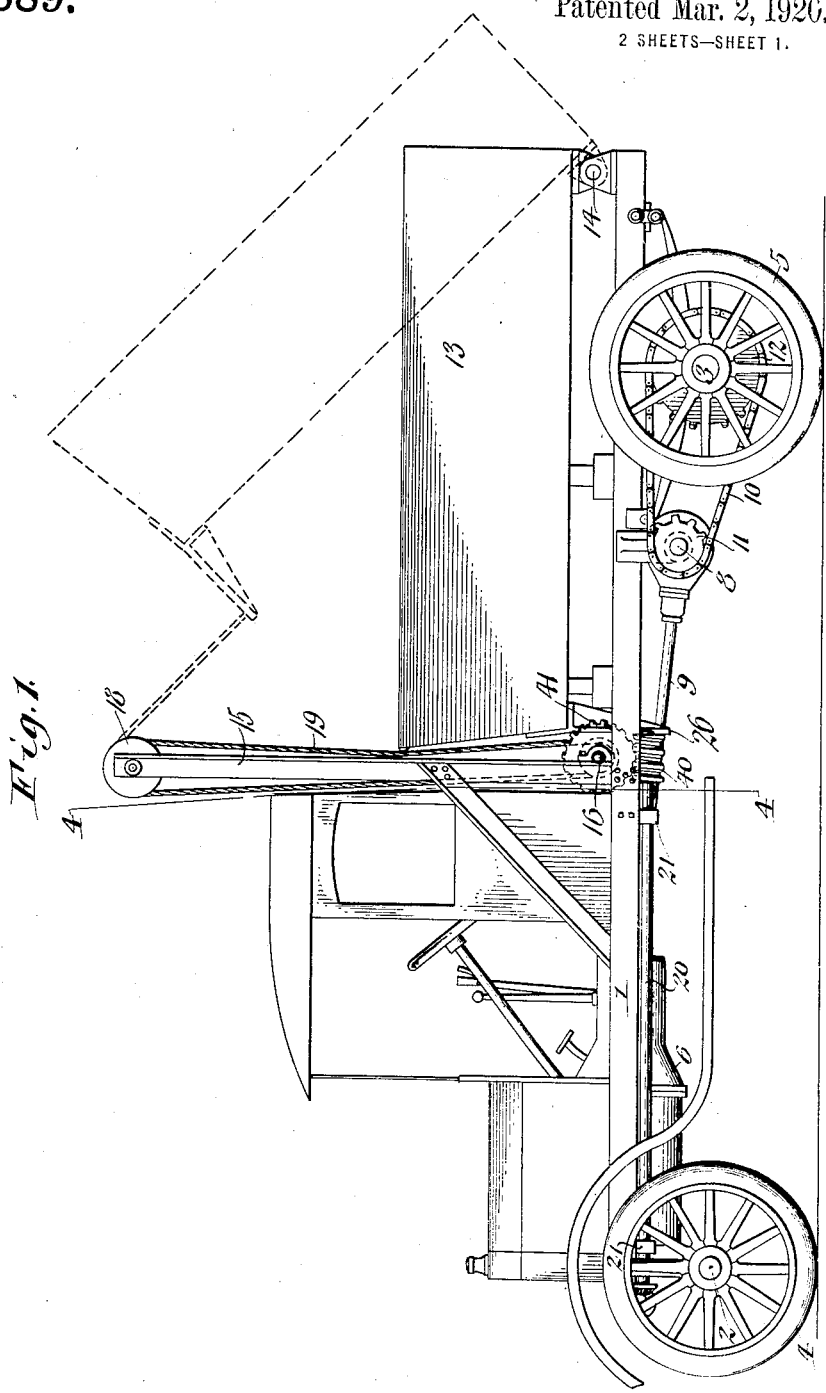

UNITED STATES PATENT OFFICE.

ALLAN J. AITKEN, OF BUFFALO, NEW YORK.

POWER ATTACHMENT FOR AUTOMOBILES.

1,332,589.   Specification of Letters Patent.   Patented Mar. 2, 1920.

Application filed July 30, 1917. Serial No. 183,450.

*To all whom it may concern:*

Be it known that I, ALLAN J. AITKEN, a citizen of the United States, residing at Buffalo, in the county of Erie and State of New York, have invented new and useful Improvements in Power Attachments for Automobiles, of which the following is a specification.

This invention relates to a power attachment for automobiles and it has the object to utilize the power plant of an ordinary pleasure automobile as part of the means for performing mechanical work on the car, other than propelling the same, without requiring any material alteration in the construction of the motor or its mounting on the main frame of the motor car, thereby permitting of converting pleasure cars into motor trucks at low cost.

My invention relates more particularly to the means whereby the power of the motor is transmitted to the means which operate the dumping box or similar device, my improvements being so organized that they form an attachment which may be applied to and combined with the engine or motor of an automobile as now ordinarily constructed and mounted on the main frame without requiring any alteration in the construction of the engine or the parts associated therewith. This enables motor vehicles which have become worn out or discarded for pleasure purposes to be utilized to advantage as motor trucks. By this means the life of the car may be extended and a considerable economy effected by its continued use as a motor truck after its utility as a passenger vehicle has terminated.

In the accompanying drawings: Figure 1 is a side elevation of an automobile which embodies my invention. Fig. 2 is a bottom plan view of the same. Fig. 3 is a fragmentary front elevation thereof. Fig. 4 is a vertical transverse section taken on the correspondingly numbered line in Fig. 1. Fig. 5 is a fragmentary longitudinal section taken on line 5—5, Fig. 3. Fig. 6 is a fragmentary vertical cross section taken on line 6—6, Fig. 5.

Similar characters of reference indicate corresponding parts throughout the several views.

The motor car or automobile which is shown in the drawings is typical of one which has been converted from a pleasure or passenger vehicle into a motor truck and in its general organization the same comprises a main frame 1 provided at its front and rear ends with transverse axles 2, 3 upon which the front steering and rear traction wheels 4, 5 are mounted respectively, a motor or engine preferably of the usual explosion type having its body or casing 6 mounted on the front part of the frame and its longitudinal shaft 7 projecting at its front and rear ends forwardly and rearwardly beyond the casing or body of the engine, and an intermediate mechanism for transmitting the power from the engine shaft 7 to the rear or traction wheels comprising a transverse shaft 8 journaled on the main frame, a longitudinal driving shaft 9 connected at its front end with the engine shaft and at its rear end with the transverse shaft 8 by means of a gearing of any suitable type, and chain belts 10 arranged on opposite sides of the frame and each passing at its front and rear turns around a sprocket pinion 11 and a sprocket wheel 12 on the corresponding ends of the transverse shaft 8 and the rear wheels or parts connected therewith.

On the rear part of the frame may be mounted various devices which require motor power for their operation. As illustrating one of many of such devices, a vertically swinging dumping box 13 is shown in Figs. 1, 2 and 4, which box is pivoted at its rear end by means of hinges 14 on the rear part of the vehicle frame, so that this box may be lowered into a horizontal position ready to be loaded with freight or material, as shown by full lines in Fig. 1, or the same may be elevated at its front end for discharging the load rearwardly therefrom, as shown by dotted lines in the same figure. The means for operating this dumping box may be varied, those shown in the drawings being suitable for this purpose and comprising an upright standard 15 mounted on the main frame in front of the dumping box, a horizontal hoisting shaft 16 journaled transversely on the lower part of this standard and provided with a hoisting drum 17, a sheave or guide wheel 18 pivotally mounted on the upper part of the standard, and a hoisting line or cable 19 passing around said sheave and secured at one of its ends to a depending lifting arm 26 on the front end of the dumping box while its opposite end is secured to the hoisting drum. For the purpose of raising the dumping box and discharging its load the hoisting shaft is turned in the proper direction for causing its drum to turn so that the respective end of the hoisting line will be wound thereon whereas upon releasing this hoisting shaft so that the dumping box may descend by gravity the hoisting line will be unwound from the drum and turn the latter in the reverse direction.

Although my improvement is capable of various embodiments one of the essentials is the employment of a longitudinal counter shaft 20 which is journaled in bearings 21 on the main frame on one side of the motor so that the front and rear ends of this counter shaft project forwardly and rearwardly beyond the front and rear ends of the engine shaft, as shown in Figs. 1 and 2. Any suitable means may be employed for operatively connecting the front ends of the engine shaft and the longitudinal counter shaft, those shown in the drawings being merely typical of one which may be used for this purpose and as there shown the same are constructed as follows:

22 represents a transverse front shaft which is journaled horizontally in a bracket 23 on the front part of the main frame and provided at its outer end with a bevel gear wheel 24 which meshes with a similar gear wheel 25 on the front end of the counter shaft. At its inner end the front transverse shaft 22 is provided with a bevel gear wheel 27 which meshes on its diametrically opposite sides with front and rear bevel clutch gear wheels 28, 29 which turn loosely on a shaft extension 30 arranged axially in line with and in front of the front end of the engine shaft. This shaft extension may be coupled with the front end of the engine shaft in any suitable manner so as to turn therewith, for instance, by means of a coupling sleeve 33 which receives the opposing ends of the engine shaft and the extension shaft and pins 31, 31 connecting this sleeve with these shafts, as shown in Fig. 5. The engine shaft usually turns in one direction only and in order to permit of turning the counter shaft in one direction or the other a clutch sleeve 34 is mounted on the shaft extension by means of a spline 32 so as to be compelled to turn therewith but capable of moving lengthwise thereon. The opposite conical ends of this clutch sleeve may be engaged with or disengaged from the conical sockets or faces 35, 36 on the opposing inner sides of the clutch gear wheels 28, 29. When the clutch sleeve is in its intermediate or neutral position and out of engagement from both of the gear wheels 28, 29 then neither of the latter are turned and the counter shaft remains at rest, but upon shifting the clutch sleeve so that it engages either one or the other clutch gear wheel, then the respective clutch gear wheel will be coupled with the shaft extension and turn with the engine shaft, whereby the counter shaft is turned in one direction, while upon shifting the clutch sleeve into engagement with the other clutch gear wheel then the counter shaft will be turned in the opposite direction by the motion derived from the engine shaft.

This clutch sleeve may be shifted into its intermediate position or into either of its operative positions by any suitable means, for instance, by the means which are shown in Figs. 2, 3 and 5, and which comprise a shifting lever 37 pivoted on the adjacent part of the main frame and provided at its inner end with a fork which engages with an annular groove in the periphery of the clutch sleeve and a spring pressed detent or dog 38 mounted on the shifting lever and engaging with a quadrant 39 mounted on the main frame.

Various means may also be employed for transmitting the motion from the counter shaft to the hoisting shaft, a practical method of accomplishing this being shown in the drawings and comprising a worm 40 mounted on the rear end of the counter shaft and meshing with a worm wheel 41 at one end of the hoisting shaft.

When the motor car is being propelled from place to place the clutch sleeve is thrown into its central or neutral position so that the power of the engine may be utilized solely for operating the car but when it is desired to dump the box or operate any other apparatus which is mounted on the rear part of the frame then the clutch sleeve is shifted into engagement with one of the clutch gear wheels so as to cause the power of the engine to actuate the apparatus with which the counter shaft is operatively connected.

It will be noted that when installing this power attachment to automobiles of usual construction that no material change in the arrangement or organization of the engine and associated parts is necessary, thereby permitting of readily utilizing the power plant of a motor car not only for propulsion purposes but also for actuating an apparatus which may be mounted on the car, thereby utilizing the power plant to advantage and eliminating manual labor and effecting a considerable economy.

I claim as my invention:

In an automobile, the combination of a main frame, an engine mounted on the front part of said frame and having an engine shaft projecting forwardly and rearwardly from the body of the engine, traction wheels supporting said frame and operatively connected with the rear end of said engine shaft, and a power transmitting mechanism comprising a counter shaft journaled lengthwise on said frame on one side of said engine, and means for operatively connecting and disconnecting the front ends of the engine shaft and counter shaft comprising an extension shaft connected with the front end of the engine shaft, a front transverse shaft journaled on the main frame in front of the engine, gearing connecting the outer end of the front transverse shaft and the front end of the counter shaft, and gearing connecting the extension shaft with the engine shaft.

ALLAN J. AITKEN.